(12) United States Patent
Kattepur et al.

(10) Patent No.: US 12,068,916 B2
(45) Date of Patent: Aug. 20, 2024

(54) NETWORK NODE AND METHOD FOR HANDLING OPERATIONS IN A COMMUNICATIONS NETWORK

(71) Applicant: Telefonaktiebolaget LM Ericsson (publ), Stockholm (SE)

(72) Inventors: Ajay Kattepur, Bangalore (IN); Nanjangud Chandrasekhara Swamy Narendra, Bangalore (IN); Ramamurthy Badrinath, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/919,519

(22) PCT Filed: Aug. 12, 2020

(86) PCT No.: PCT/SE2020/050777
§ 371 (c)(1),
(2) Date: Oct. 17, 2022

(87) PCT Pub. No.: WO2021/211028
PCT Pub. Date: Oct. 21, 2021

(65) Prior Publication Data
US 2023/0171154 A1    Jun. 1, 2023

(30) Foreign Application Priority Data

Apr. 17, 2020 (IN) .............................. 202011016593

(51) Int. Cl.
*G06F 15/16*    (2006.01)
*H04L 41/0823*  (2022.01)
*H04L 41/5003*  (2022.01)

(52) U.S. Cl.
CPC ...... *H04L 41/0823* (2013.01); *H04L 41/5003* (2013.01)

(58) Field of Classification Search
CPC .................. H04L 41/0823; H04L 41/5003
See application file for complete search history.

(56) References Cited

U.S. PATENT DOCUMENTS 9,446,511 B2   9/2016  Kuffner et al.
9,671,777 B1*  6/2017  Aichele .................. B25J 9/1666
(Continued)

FOREIGN PATENT DOCUMENTS

| CN | 110083166 A | 8/2019 |
| EP | 3479972 A1 | 5/2019 |
| WO | 2019234702 A2 | 12/2019 |

OTHER PUBLICATIONS

International Search Report and the Written Opinion of the International Searching Authority, issued in corresponding International Application No. PCT/SE2020/050777, dated Feb. 12, 2021, 14 pages.

(Continued)

*Primary Examiner* — Hieu T Hoang
(74) *Attorney, Agent, or Firm* — Sage Patent Group

(57) ABSTRACT

A method performed by a network node for handling one or more operations in a communications network comprising a plurality of computing devices performing one or more tasks. The network node obtains initial parameters relating to the plurality of computing devices, environment and the communications network; and generates a plan by taking one or more operation goals involving the plurality of computing devices into account as well as the obtained initial parameters, wherein the generated plan relates to operation of the plurality of computing devices. The network node further computes a number of back-up plans, wherein the number of back-up plans are taking one or more events (Continued)

into account wherein the one or more events relate to operation of the plurality of computing devices; and executes one or more operations using the generated plan, and in case the one or more events occur, using a computed back-up plan.

16 Claims, 9 Drawing Sheets

(56) References Cited

U.S. PATENT DOCUMENTS

| | | | | |
|---|---|---|---|---|
| 9,815,201 | B2* | 11/2017 | Embon | B25J 9/1666 |
| 11,154,986 | B2* | 10/2021 | Ben-Tsvi | G05B 19/41865 |
| 11,340,079 | B1* | 5/2022 | Ebrahimi Afrouzi | G06T 7/70 |
| 11,526,823 | B1* | 12/2022 | Ben-Tsvi | G05D 1/021 |
| 2005/0216182 | A1* | 9/2005 | Hussain | G01C 21/20 |
| | | | | 701/532 |
| 2010/0211544 | A1* | 8/2010 | Chen | H04L 67/1095 |
| | | | | 709/248 |
| 2010/0312388 | A1* | 12/2010 | Jang | G05D 1/0088 |
| | | | | 700/248 |
| 2014/0351819 | A1* | 11/2014 | Shah | G06F 9/4881 |
| | | | | 718/103 |
| 2016/0183419 | A1* | 6/2016 | Fujita | H05K 13/0404 |
| | | | | 29/739 |
| 2016/0316508 | A1* | 10/2016 | Hong | H04W 76/15 |
| 2018/0150085 | A1 | 5/2018 | Dey et al. | |
| 2018/0164785 | A1 | 6/2018 | Frederick et al. | |
| 2018/0183855 | A1* | 6/2018 | Sabella | G06F 9/5072 |
| 2018/0311815 | A1* | 11/2018 | Shaw | B25J 9/1671 |
| 2018/0316628 | A1* | 11/2018 | Dey | B25J 9/1661 |
| 2018/0373247 | A1* | 12/2018 | Wang | G06N 5/022 |
| 2019/0049975 | A1 | 2/2019 | Katterpur et al. | |
| 2019/0091865 | A1* | 3/2019 | Amacker | B25J 9/0003 |
| 2019/0227532 | A1* | 7/2019 | Keselman | B25J 11/005 |
| 2019/0228495 | A1* | 7/2019 | Tremblay | G05B 13/00 |
| 2019/0324456 | A1 | 10/2019 | Jason et al. | |
| 2019/0340249 | A1* | 11/2019 | Connell | G06F 40/58 |
| 2020/0016754 | A1* | 1/2020 | Skubch | B25J 9/1682 |
| 2020/0033867 | A1* | 1/2020 | Grant | G05D 1/0217 |
| 2020/0196191 | A1* | 6/2020 | Deparisse | H04L 47/125 |
| 2020/0225673 | A1* | 7/2020 | Ebrahimi Afrouzi | |
| | | | | G05D 1/0016 |
| 2021/0049037 | A1* | 2/2021 | Kattepur | B25J 9/1664 |
| 2021/0088337 | A1* | 3/2021 | Koubaa | H04L 67/025 |
| 2021/0141675 | A1* | 5/2021 | Yang | G06F 9/5016 |
| 2022/0161426 | A1* | 5/2022 | Ben-Tsvi | B25J 9/1661 |

OTHER PUBLICATIONS

Hu et al. "Cloud Robotics: Architecture, Challenges and Applications" 2012 IEEE, pp. 21-28.

Karapinar et al. "A Robust Planning Framework for Cognitive Robots" Cognitive Robotics AAAI Technical Report WS-12-06, 2012, Association for the Advancement of Artificial Intelligence (www.aaai.org), pp. 102-108.

Florent Teichteil-Konigsbuch, Charles Lesire, Guillaume and Infantes (2011), A generic framework for anytime execution-driven planning in robotics. In International Conference on Robotics and Automation (ICRA), Shanghai, China. https://www.researchgate.net/publication/221068429_A_generic_framework_for_anytime_execution-driven_planning_in_robotics, 7 pages.

Kattepur et al., Resource Constrained Offloading in Fog Computing. Middleware Workshop, 2016. https://dl.acm.org/citation.cfm?id=3022871, 6 pages.

Hu et al., iRobot-Factory: An intelligent robot factory based on cognitive manufacturing and edge computing, Future Generation Computer Systems, vol. 90, Jan. 2019, pp. 569-577.

* cited by examiner

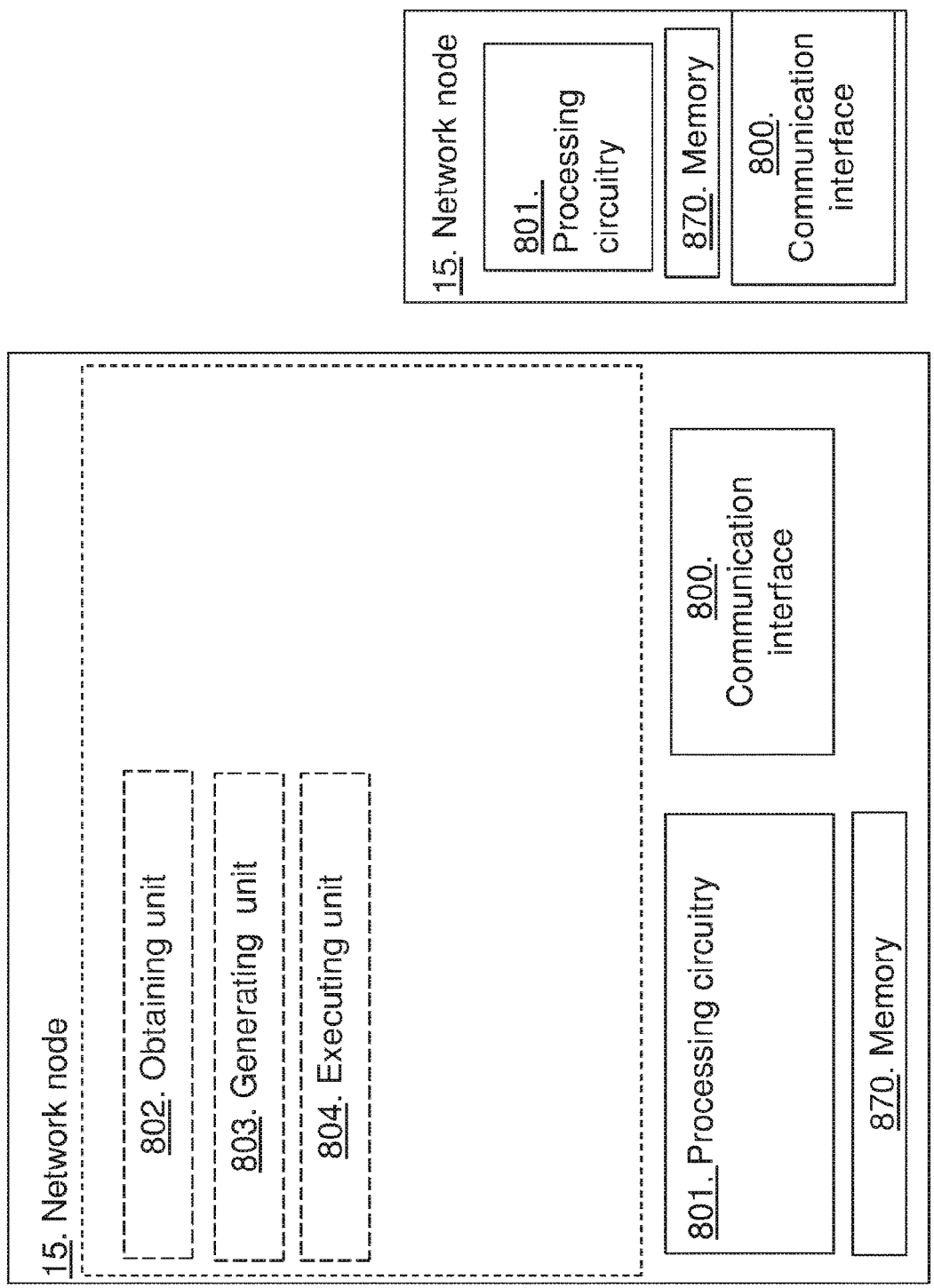
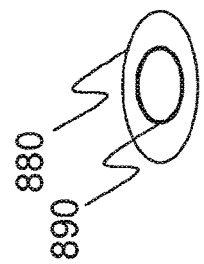
FIG. 8

NETWORK NODE AND METHOD FOR HANDLING OPERATIONS IN A COMMUNICATIONS NETWORK

CROSS REFERENCE TO RELATED APPLICATION(S)

This application is a 35 U.S.C. § 371 National Phase of PCT/SE2020/050777, filed Aug. 12, 2020, designating the United States, which claims the benefit of Indian Application No. 202011016593, filed Apr. 17, 2020, the disclosures of which are incorporated herein in their entirety by this reference.

TECHNICAL FIELD

Embodiments herein relate to a network node and a method performed therein. Furthermore, a computer program product and a computer readable storage medium are also provided herein. In particular, embodiments herein relate to handling operations in a communications network.

BACKGROUND

In a typical communications network, computing devices, also known as process devices, wireless communication devices, robot devices, operational devices, mobile stations, vehicles, stations (STA) and/or wireless devices, communicate with one or another or with a server or similar via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node. The radio network node may comprise one or more antennas providing radio coverage over one or more cells.

With the advent of Industry 4.0 factories and retail warehouses, teams of computing devices such as multi-robot teams are expected to coordinate operations among themselves to complete complex tasks. As the individual robots have limited on-board processing capacities, some tasks are to be offloaded to other robots, edge devices or the cloud in order to complete tasks within time limits. This will employ a complex multi-robot coordination, ensuring that the communication channels are available for task offloading, splitting up offloaded computations and ensuring that high level goals are met.

Typically, these coordination rules are static with predefined strategies for coordination. For instance, only one edge node may be used for offloading computation; concurrent actions may be prevented to aid in sequential task completion. There are also no strategies in place for failures in communication or inability to meet computation deadlines. A centralized optimizer is typically employed to schedule such policies. However, the increasing complexity and dynamism of future such multi-robot teams raise a need to natively incorporate such dynamism. As such, static deployment techniques as shown in e.g. EP 3 479 972 A1 are ill suited for large, complex, multi-robot deployments. Pure optimization/centralized monitoring models are not robust enough to dynamically reconfigure or handle the scale of these environments.

Some of the constraints that are observed in Industry 4.0 multi-robot deployments are:

1. Robots are autonomous and create plans to complete tasks individually. Some amount of coordination may be integrated by using effective task division/communication between robots, see Kattepur et al., Resource Constrained Offloading in Fog Computing. Middleware Workshop, 2016.
2. Individual robots have limited on-board battery and computational capacities. In order to complete task processing in a timely fashion, coordinated efforts are needed, possibly utilizing Edge/Fog/Cloud computational resources see US 20180150085.
3. The robots are mobile in a dynamic environment where exact location and communication capacities may not be accurately estimated. There may be areas in manufacturing/warehouse environments where the robots may not be able to communicate with one another.
4. There may be variations in the datasets collected by the onboard sensors, dynamic changes in robot task goals and timelines for the computations to complete. Energy efficient computational location can be an additional constraint.

SUMMARY

Due to the above constraints, static optimization rules or manual handling of computing device task completion may be ill advised. A more automated technique that jointly handles, for a plurality of computing devices, task planning, path-planning, task offload scheduling, communication channel variation and task completion constraints is needed.

An object of embodiments herein is, therefore, to improve coordination of operations for a plurality of computing devices in a dynamical and efficient manner.

According to an aspect of embodiments herein, the object is achieved by a method performed by a network node for handling one or more operations in a communications network comprising a plurality of computing devices performing one or more tasks. The network node obtains initial parameters relating to the plurality of computing devices, environment and the communications network. The network node further generates a plan by taking one or more operation goals involving the plurality of computing devices into account as well as the obtained initial parameters, wherein the generated plan relates to operation of the plurality of computing devices; and computes a number of back-up plans, wherein the number of back-up plans are taking one or more events into account wherein the one or more events relate to operation of the plurality of computing devices. The network node further executes one or more operations using the generated plan, and in case the one or more events occur the network node executes one or more operations, using a computed back-up plan related to the occurred one or more events.

It is furthermore provided herein a computer program product comprising instructions, which, when executed on at least one processor, cause the at least one processor to carry out any of the methods above, as performed by the network node. It is additionally provided herein a computer-readable storage medium, having stored thereon a computer program product comprising instructions which, when executed on at least one processor, cause the at least one processor to carry out the method according to any of the methods above, as performed by the network node.

According to another aspect of embodiments herein, the object is achieved by providing a network node for handling one or more operations in a communications network comprising a plurality of computing devices performing one or more tasks. The network node is configured to obtain initial parameters relating to the plurality of computing devices, environment and the communications network. The network node is further configured to generate a plan by taking one or more operation goals involving the plurality of computing devices into account as well as the obtained initial parameters, wherein the generated plan relates to operation of the plurality of computing devices; and to compute a number of back-up plans, wherein the number of back-up plans are taking one or more events into account wherein the one or more events relate to operation of the plurality of computing devices. The network node is furthermore configured to execute one or more operations using the generated plan, and in case the one or more events occur execute one or more operations, using a computed back-up plan related to the occurred one or more events.

Since the coordination of offloading task/processing among computing devices such as mobile robots, edge/fog devices and the cloud is a complex problem, it is herein suggested an automated planning and scheduling technique. This may e.g. involve specifying a number of domains of interest including computing devices, communication channels, computation entities and time constraints. The plan generated i.e. a joint plan is developed that captures task planning, path planning and computation offload planning. Furthermore, different back-up plans may be generated for the same initial conditions, that are dependent on the "soft" goals to be solved such as energy usage, communication link maintenance, increased probability of meeting computation deadlines and so on. It should be noted that this planning happens over a timed horizon—effective strategies to reuse template plans so that repeated planning may be avoided may also be considered.

Current deployments of multi-robot coordination in Industry 4.0 make use of optimization and scheduling algorithms with fixed topologies. Embodiments herein propose joint planning and optimization techniques that take e.g. path planning, task allocation, offloading locations and communication models into account for multi-robot coordination. This will involve modeling all these domain features into e.g. a unified artificial intelligence (AI) planning solution using machine learning (ML) models to generate and/or compute the plan and/or the back-up plans. The back-up plans are used to enable incorporation of dynamic changes in deployment, e.g. in case of events, failures, communication loss, that would otherwise have typically resulted in restarting the optimizer/scheduler. By incorporating back-up plans such as contingent plans or a failure resolution plans, robust reconfigurations can be executed that maintains the global task execution while proposing granular local changes to exit from failed states.

Embodiments herein provide a scalable architecture, planning strategies and built in reliability for multi-robot task offloading. Embodiments herein thus provide manners and apparatuses to improve coordination of multi-computing device operations in a dynamical and efficient manner.

BRIEF DESCRIPTION OF THE DRAWINGS

Examples of embodiments herein are described in more detail with reference to the attached drawings in which:

FIG. 8 shows a block diagram depicting a network node according to embodiments herein.

DETAILED DESCRIPTION

Figure 1:
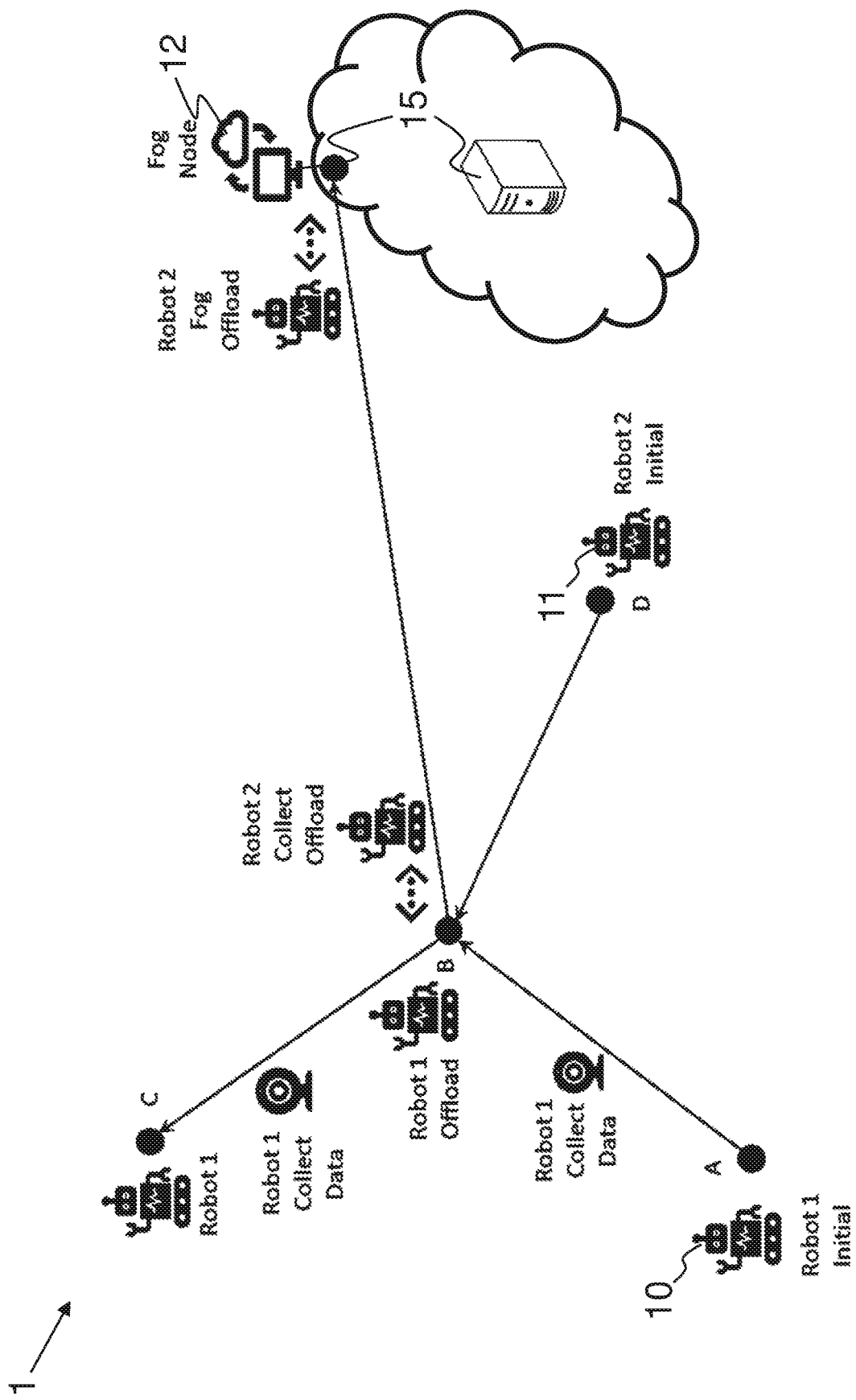
FIG. 1 shows a schematic overview depicting a communications network according to a deployment of embodiments herein.

FIG. 1 is a schematic overview depicting a communications network 1 wherein embodiments herein may be implemented. The communications network 1 comprises one or more Radio Access Networks (RANs) and one or more Core Network (CNs). The communications network 1 may use any technology such as 5G new radio (NR) but may further use a number of other different technologies, such as, Wi-Fi, long term evolution (LTE), LTE-Advanced, wideband code division multiple access (WCDMA), global system for mobile communications/enhanced data rate for GSM evolution (GSM/EDGE), worldwide interoperability for microwave access (WiMax), or ultra mobile broadband (UMB), just to mention a few possible implementations.

The communications network 1 comprises a number of computing devices such as robots or similar performing one or more tasks, e.g. a first computing device 10 and a second computing device 11. The computing devices may comprise e.g. process, devices, wireless communication devices, robots, operational devices, mobile stations, vehicles, stations (STA) and/or wireless devices. The first computing device 10 may collect data along a travelling path and may offload a task or data regarding a task to the second computing device 11. The second computing device 11 may e.g. collect data from the first computing device 10 and move towards an access node such as a fog node 12 of a cloud or similar.

According to embodiments herein the communications network 1 comprises a network node 15 e.g. an access node, a standalone node, a server, a cloud node or even a computing device with high processing capability. The network node 15 is configured to plan operations in the communications network 1.

In order to demonstrate the use of planning, offloading and reconfiguration, we make use of the scenario presented in the FIG. 1. Robot 1 has limited on-board computation and data storage capabilities. In order to continue sensing progress to the next stage, the collected data for computation analysis may efficiently be offloaded along location points along an operation route also referred to waypoints. However, waypoints such as location B are far away from suitable Fog compute nodes. In order to recover from this scenario, an additional Robot 2 is employed to collect the offloaded data along the path and move towards the Fog computation node. This involves coordinated task and path planning for both the robots. Exact offloading locations and failure handling must also be incorporated. Such complex deployments with realistic limitations require a robust and scalable automated planning, scheduling, monitoring and re-configuration architecture (not seen explicitly in state of the art). Static scheduling and optimization are ill equipped for dynamic reconfiguration in such situations.

In order to provide an efficient solution of planning operations embodiments herein provide a manner of generating a plan of operations and further computing a number of back-up plans, taking one or more possible events into account.

The following advantages may be achieved by employing one or more embodiments herein:

Introduction of an artificial intelligence (AI) planner in the network node 15 for generating the plan as well as the back-up plans that capture the complex interaction between multi-robot task planning, path planning, computation offloading and communication between e.g. intelligent robots.

Joint plan and back-up plans are generated that can take in constraints from task offloading to generate alternative paths/waypoints for offloading entities. This can exploit both Fog/Edge/Cloud resources and other mobile robotic entities. Note that the model can capture heterogeneity/diversity in communication types, computation types, and robot battery capacities to generate optimal task and computation offloading plans.

A plan dispatcher may be provided that monitors computation progress, offloading entities and other computing device locations for failures in tasks. This may dynamically be fed to a re-planner or a back-up plan is generated at the initial step. This reconfiguration ability is critical in Industry 4.0 deployments with dynamic changes in robotic coordination and plans.

Figure 2:
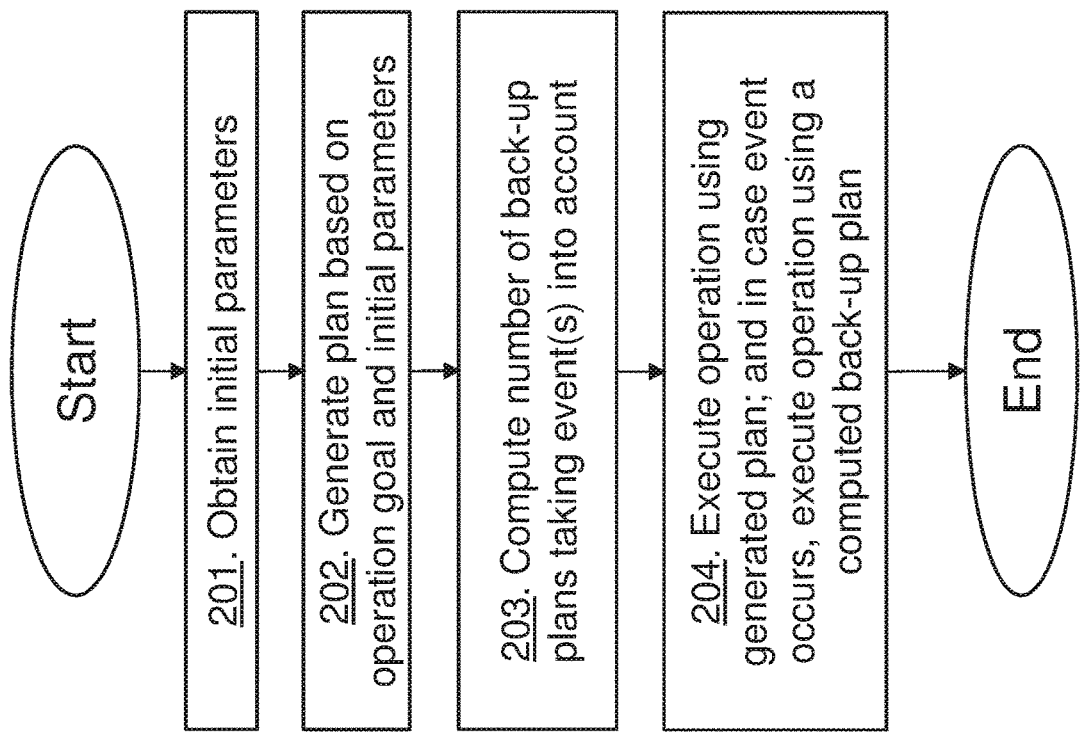
FIG. 2 shows a method performed by a network node according to embodiments herein.

The method actions performed by the network node 15 for handling one or more operations in the communications network 1 comprising a plurality of computing devices 10,11 performing one or more tasks according to embodiments will now be described with reference to a flowchart depicted in FIG. 2. The actions do not have to be taken in the order stated below, but may be taken in any suitable order. Actions performed in some embodiments are marked with dashed boxes.

Action 201. The network node 15 obtains initial parameters relating to the plurality of computing devices, environment and the communications network 1. This may be retrieved or received from another network node or manually input or configured. The initial parameters may comprise a device specific parameter, a communication topology, map information of the environment and/or a location specific parameter. The device specific parameter may comprise one or more of the following: computational capability, memory capability, and/or battery capability of the computing devices. The initial parameters may be recorded by one or more computing devices or network node, or pre-configured.

Action 202. The network node 15 further generates a plan by taking one or more operation goals involving the plurality of computing devices 10,11 into account as well as the obtained initial parameters, wherein the generated plan relates to operation of the plurality of computing devices. The generated plan may comprise communication paths, movement paths, operation goals, computational offloading, and/or task offloading between the plurality of computing devices. The one or more operation goals may comprise at least a goal relating to time, battery usage, computational capacity, and/or communication performance. The plan may be generated using a machine learning model, e.g. a neural network and/or decision tree, e.g. in an AI planner.

Action 203. The network node 15 computes a number of back-up plans, wherein the number of back-up plans are taking one or more events into account wherein the one or more events relate to operation of the plurality of computing devices 10,11. The one or more events may relate to changing environment, performance of the computing devices 10,11, and/or the communications network 1. The number of back-up plans may be computed using changed initial parameters. The one or more events may comprise a computing device failure, a communication loss, alteration in environment, and/or a battery degradation. The one or more events may comprise a deviation in quality of service (QoS) limits or a failure to reach a goal with a current plan. The plan and/or the number of back-up plans may be generated or computed using a machine learning model, e.g. a neural network and/or decision tree, e.g. in an AI planner. The ML models mentioned herein used to generate the plan and/or the back-up plans cover a wide range of computational graph models such as ML models, including those trained using deep learning, e.g. artificial neural networks such as Convolutional Neural Networks, and may reduce execution latency without expensive hardware equipment in the local network node.

Action 204. The network node 15 executes one or more operations using the generated plan; and in case the one or more events occur, then the network node 15 executes one or more operations using a computed back-up plan related to the occurred one or more events.

Compared with traditional approaches, AI planning and scheduling applied to these techniques can provide the following improvements:

| Scheduling/Optimized Task Allocation | AI Planning according to embodiments herein |
|---|---|
| Optimization performed based on initial conditions of compute power, energy levels and location. Paths and communication variations not considered. | Joint plans that consider task constraints (timing, robots), path constraints (waypoints, communication), computation resources (other agents, edge devices), energy constraints. |
| While parallelizing tasks is possible at the computation level, concurrent task and path planning cannot be considered. | Temporal and multi-agent plans have inherent concurrency allowing path/task/computation offloading to happen in a concurrent fashion. |
| Difficult to reconfigure to changes/failures typically have to store current state and re-compute new schedule to complete tasks. This is both computationally and temporally inefficient. | The use of contingent/runtime monitoring and back-up plans allows for on-the-fly reconfigurations in case of failures or unforeseen deployment changes. This is especially crucial in multi-computing device deployment scenarios. |

Figure 3:
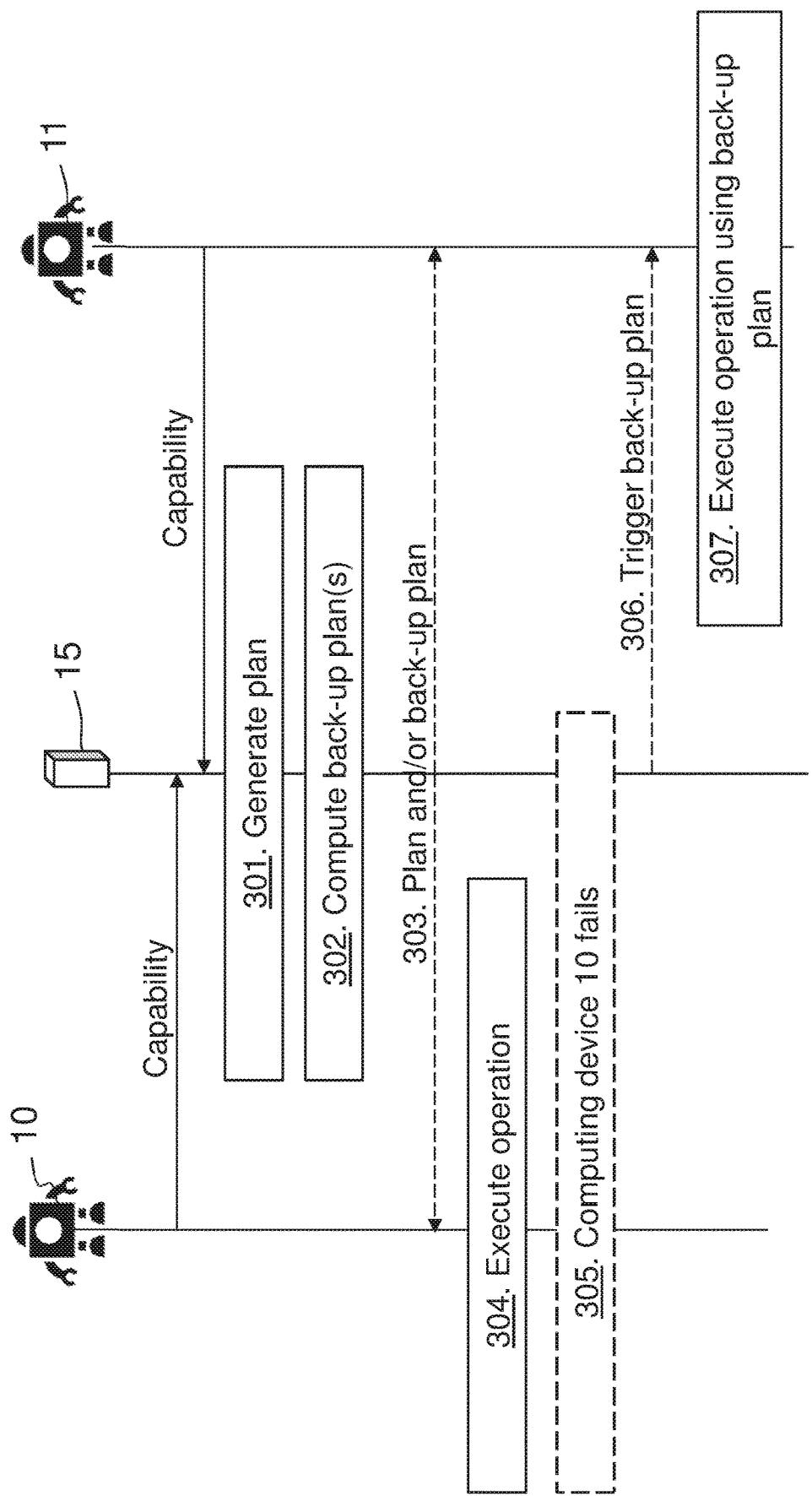
FIG. 3 shows a combined signalling scheme and flowchart depicting embodiments herein.

FIG. 3 is a combined signalling scheme and flowchart depicting embodiments herein.

The network node 15 collects or retrieves initial parameters, i.e. capabilities, of the communications network 1 and/or the computing devices such as the first computing device 10 and the second computing device 11.

Action 301. The network node 15 generates the plan e.g. by running the initial parameters in a ML model as well as one or more goal settings such as a set energy consumption or a set processing time. The plan generated may define routes, computer capacity offloading and other details to run the operations of the computing devices 10,11.

Action 302. The network node 15 further computes a number of back-up plans for a number of events such as failures, changes or errors.

Action 303. The network node 15 may then transmit the generated plan and/or back-up plans to one or more computing devices. E.g. the network node 15 may transmit movement plans and e.g. computing plans to the first computing device 10 and the second computing device 11.

Action 304. The first computing device 10 may execute operations such as carrying out tasks and/or computing certain calculations or operations.

Action 305. A failure or other event may occur. E.g. the first computing device 10 may fail or loose communication connection. This may be detected by the network node 15 or e.g. reported to the network node 15.

Action 306. Since a back-up plan for this event has already been computed the network node executes the back-up plan e.g. sends a trigger to the second computing device 11.

Action 307. The second computing device 11 may then execute the back-up plan triggered by the event. For example, the back-up plan may be triggered through a common domain knowledge base where the state changes, indicating the one or more events, are monitored and/or updated. All computing devices may access this common domain knowledge base and may internally trigger alternative actions, i.e. operations related to the back-up plan, if one of the other computing devices in the plan did not e.g. achieve desired goal state. Alternatively or additionally, the network node or a computing device may broadcast indication of failed actions to e.g. nearby computing devices triggering alternate events. Robot 1 can e.g. broadcast failure to offload tasks, that may prompt unused Robot 2 to participate in the activity according to a stored back-up plan.

Figure 4:
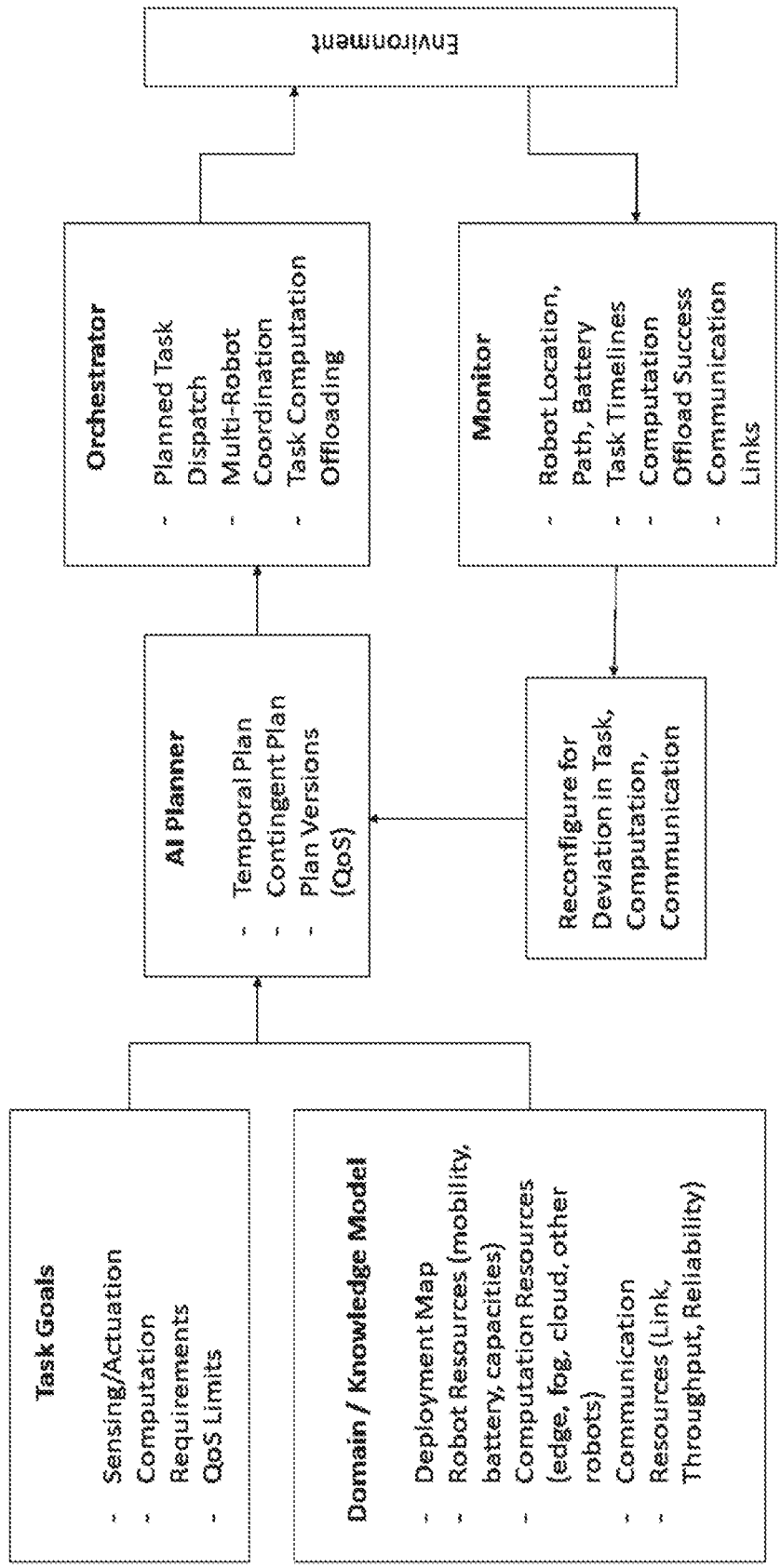
FIG. 4 shows an architectural overview of embodiments herein.

FIG. 4 presents an architectural overview of embodiments herein. Given a domain of interest, e.g. Industry 4.0 factory with multiple robots, the network node 15 generates a task plan to successfully complete a high-level goal, e.g. locate and bring object A from a factory to a certain location. This plan cannot be completed by a single computing device, needing the network node 15 to create a complex coordination plan taking e.g. robot capacities, communication capabilities and available computing devices into account. The plan is then deployed on the set of computing devices that interact with the environment. A monitor agent may map tasks to executions in the environment. Failures or deviations are handled through the back-up plans. Note that events such as computation failures, communication losses or robotic exception handling are handled in a unified fashion within this framework. This resembles the MAPE-K loop that has been proposed in autonomic systems literature.

Embodiments herein incorporate one or more of the following contributions:

Rich planning domain modeling for computing devices incorporating knowledge of topology, device capabilities, compute nodes, communication network and task constraints.

Joint optimal planning of multi-computing device tasks and computing offload locations taking the domain information into account.

Robust contingent planning considering possible failures in links and redundant computation offload locations.

Re-configuration of deployments in an automated fashion if planned tasks do not execute with bounds of latency, energy utilization or computation optimization.

Embodiments herein integrate AI planning and scheduling techniques to handle the dynamism in multi-computing device deployments. These embodiments are described herein.

Domain Knowledge Modelling.

A first step in providing a planning and deployment solution for complex multi-computing devices coordination is to model a knowledge domain of interest e.g. using a Planning Domain Definition Language (PDDL). The following predicates, i.e. the initial parameters, in a PDDL domain model may be incorporated that integrate multiple aspects of complex deployments. A snapshot of the domain file instance may be viewed as a current knowledge of the deployment environment. Each of the predicates are possible states of the environment that may be modified by actions taken by the computing devices during task execution.

| Robot Predicates | Explanation |
| --- | --- |
| Robot_haslocation,Locationmap | Current Location Coordinates, Map of Area |
| Robot_hasBattery | Current Battery Levels |
| Robot_hasSensor,Robot_hasActuator | Sensor, Actuator Properties, outputs |
| Robot_trajectory, Robot_neighbours | Robot Path plan and neighbours |
| Computation Predicates | Explanation |
| Computation_CPU, Computation_Memory, Compatation_Load | Computation hardware specification, current levels |
| Computation_offload, Redundant_computation, Cache_ Location | Computation offloading location, redundancies, caching |
| Task_Accuracy, Task_completion | Globaltask constraints to be adhered |
| Communication Predicates | Explanation |
| hasCommunication_link, dataTransfer | Links between robots/computation nodes |
| hasDeadZone, Obstacles | Location of obstacles, dead communication zones |
| Task_Energy | Energy constraints in communciation |

Initial parameters and goals:

| | |
|---|---|
| Robot characteristics | Robot_hasLocation ?robotID ?location |
| | Robot_hasBattery ?robotID ?battery_level |
| | Robot_hasSensor ?robotID ?sensorID |
| | Robot_hasActuator ?robotID ?actuatorID |
| Computation Characteristics | Computation_CPU ?devideID ?cpucore ?frequency |
| | Computation_memory ?deviceID ?memory |
| | Computation_load ?deviceID ?current_load |
| | Computation_offload ?deviceFrom ?DeviceTo ?constraints |
| Communication Characteristics | hasCommunication_link ?robotID ?deviceID strength |
| | hasBandwidth ?deviceID ?BW |
| | hasDeadZone ?robotID ?location |
| | dataTransfer ?deviceFraom ?DeviceTo ?constraints |
| Deployment | Locationmap ?coordinates |
| | Obstacles ?name ?coordinates |
| | Other_robots ?robotID ?path |
| Robot Path | Robot_trajectory ?robotID ?waypoints |
| | Robot_neighbours ?robotID1 ?robotID2 ?location ?timestamp |
| Goal Task Constraints | Task_Accuracy ?taskID ?accuracy |
| | Task_completion ?taskID ?Time |
| | Task_Energy ?taskID ?energylevel |
| System Redundancies/Reliability | Redundant_computation ?taskID ?deviceID |
| | Redundant_communication ?deviceID ?link |
| | Cachejocation ?data ?device ?validity |
| | SLA_levels ?taskID ?SLA |

The above models may consist of a label (e.g. Robot_hasLocation) and parameters (e.g. ?robotID ?location). These specific instances are specified in the planning problem definition, described next.

Optimal Planning and Scheduling.

The above domain knowledge model may be used to plan multi-computing device coordination tasks involving e.g. task constraints, communication links, offload compute nodes and energy limitations. The multi-computing device task completion problem is typically solved by offloading subsets of the computation task, e.g. Simultaneous Localization and Mapping (SLAM), knowledge sharing, anomaly detection, to other computing devices or the Edge/Fog/Cloud. It must be noted that there can be nuances to the planned deployment and those observed at runtime, requiring re-configuration and re-planning.

An example PDDL planning scenario is described as follows, that is used in conjunction with the domain knowledge model:

```
(define (problem warehouse-multirobot-prob)
(:domain knowrob_robot)
(:objects   warehouse - domain_model
            Robot1 Robot2 - robot
            Sensor_data Offload_data - data
            Gateway robot_peer - communication_device
            Fog_Node Edge1 - computation_device)
(:init      (Robot_hasLocation Robot1 LocationA)
            (Robot_hasBattery Robot1 High)
            (hasCommunication_link Robot1 Fog1 high)
            (Computation_load Fog_Node low_load)
            (Robot_neighbours Robot1 Robot2 LocationB 35.00
            (= (total_time) 0))
(:goal (and (Robot1 result_complete)))
(:metric minimize + (total_time) (energy)))
```

The above planning problem integrates task constraints, goal constraints, communication networking and possible computation offload locations. Since it covers multi-computing devices scenarios, the entire computation cannot be performed by a single robot given the latency/energy constraints. Typically, this is done via offloading computation to a more powerful node.

If the exact computation time, e.g. Amdahl/Gustafson's law giving the theoretical speedup in latency of the execution of a task at the computation time, and the time needed for offloading (dependent on channel characteristics, battery capacities) are known, the problem reduces to finding an appropriate offloading location. Amdahl's law can be formulated in the following way:

$$S_{parallel}(s) = \frac{1}{(1-p) + \frac{p}{s}}$$

where $S_{parallel}$ is the theoretical execution speedup, s is the speedup of the parallelizable task and p is the proportion of tasks that are parallelized.

If a single offloading location is unable to process the entire dataset within the goals defining time/energy limitations, the dataset must be subdivided. Optimal way to subdivide this dataset may be by determining optimal locations to offload and/or whether multiple hops are needed for the offloading.

Using these constraints and a PDDL solver such as a planner using e.g. a metric fast forward (FF) or Local search for Planning Graphs (LPG), automated temporal plans are generated that set task, movement path and computation offload planning.

Robot 1 Plan:
  Time: (ACTION) [action Duration; action Cost]
  0.0000: START ROBOT1 LOC_A [D:5.00]
  5.0000: COLLECT_DATA ROBOT1 [D:30.00]
  5.0000: MOVE ROBOT1 LOC_B [D:30.00]
  35.0000: OFFLOAD_DATA ROBOT1 ROBOT2 LOC_B BLUETOOTH [D:40.00]
  75.0000: MOVE ROBOT1 LOC_C [D:20.00]
Robot 2 Plan:
  Time: (ACTION) [action Duration; action Cost]
  0.0000: START ROBOT2 LOC_D [D:20.00]
  20.0000: MOVE ROBOT2 LOC_B [D:15.00]
  35.0000: COLLECT_DATA ROBOT2 ROBOT1 LOC_B BLUTOOTH [D:30.00]
65.0000: MOVE ROBOT2 FOG_NODE [D:20.00]
85.0000: OFFLOAD_DATA ROBOT2 FOG_NODE BLUETOOTH [D:30.00]

While the generated plans, example of action 301 in FIG. 3, given above might work in many deployments, there are cases where computation failures, communication losses and robot failures can lead to critical mission failures. Unlike static optimization/scheduling, the advantage of automated planning is the ability to synthesize plans for such contingencies. These are seen next.

While the initial generated plan may be optimistic on the execution capabilities, environmental conditions or other events may introduce changes that are to be dynamically handled. Due to the inherent ability of PDDL style planners to handle state changes, these special situations are incorporated as a one or more (number of) back-up plans referred to as contingent plans. The computation of the back-up plans also denoted as Robust Contingent Planning is exemplified below:

1. The robots have limited battery capacities—after a given time interval, some of the robots may dock for charging to battery charging stations. Tradeoffs of performing individual tasks vs. serving together robots will be considered.

Example: Robot1 has lower battery, causing low power transmission:
35.0000: OFFLOAD_DATA ROBOT1 ROBOT2 LOC_B ZIGBEE [D:60.00]

2. Multi-computing device path planning may consider offloading locations. Robots may be positioned/scheduled to arrive at certain locations so that offloading can happen reliably. The robots may then move closer to access points/gateways to offload computations effectively. This may lead to sub-optimal trajectories for individual robots; however, it will ensure the entire multi-robot coalition tasks are completed.

Example: Robot2 failure causing new plan for Robot 1:
5.0000: MOVE ROBOT1 LOC_B [D:30.00]
35.0000: MOVE ROBOT1 FOG_NODE [D:40.00]
75.0000: OFFLOAD_DATA ROBOT1 FOG_NODE BLUETOOTH [D:30.00]

3. The assumption is that all offloaded computations are complete on time. In case this does not happen, an alternative redundant computational unit may be used. Tradeoffs between reliability and energy/computational overheads may be performed.

Example: Fog nodes such as access node are not reliable, needing redundancies in computation:
85.0000: OFFLOAD_DATA ROBOT2 FOG_NODE1 BLUETOOTH [D:30.00]
85.0000: OFFLOAD_DATA ROBOT2 FOG_NODE2 WIFI [D:20.00]

4. The communication capacities and battery use vary. There may be robots that use low energy, low bandwidth communication to offload data between each other (Bluetooth, Zig Bee). However, the access points/smart gateways have higher bandwidth communication—optimizing this variable communication rates jointly with task offloading.

Example: Higher data rates/faster upload:
35.0000: OFFLOAD_DATA ROBOT1 ROBOT2 LOC_B WIFI [D:5.00]

5. One may also consider whether heterogeneous robots that only perform a specific category of tasks (providing link, providing computation, acting as relay, acting as redundant buffer) are used or not.

Note that there may be changes in the plan dependent on constraints/failures. These may be planned beforehand in back-up plans using contingent planners or re-planning from time to time. These features are handled in a dynamic fashion with the use of temporal/contingent planners and execution modules. This can also be suitably extended to multiple offload points, heterogeneous computation capacities and redundant computations.

Unlike traditional scheduling and optimization formulations, the principal advantage of posing the multi-robot computation offloading problem via automated planning and scheduling is the ability to reconfigure in dynamic scenarios. Static optimization and scheduling are ill suited for scenarios with moving objects, obstacles, failure of nodes and intermittent communication.

A high level view of the interaction between robotic entities, communication channels and available compute nodes are provided above. In case of failure in any of the modules, alternatives will have to be executed by the failure handling planner. We see this as an interaction between the following planners:

Task Planner—Execution Monitor—Failure Handling Planner/Reconfiguration

Examples of new plans are given below—this may be a part of a MAPE-K loop for reconfiguration. These are encoded as predicates in the failure handling domain resulting in automatic composition of actions to lead to appropriate goals.

| Task Plan | Failure States; events | Repair Actions; back-up plans |
|---|---|---|
| Complete Task Maintain Time/Energy Limits Follow Deployment Plan | Robot 1 Sensor Failure | Replace Robot 1 location with Robot 2 Make use of Robot 1 as a node for computation offloading/movement to Edge |
| | Robot 1 Mobile Actuator Failure | Replace Robot 1 Location with Robot 2 - collect data/computation available Make use of Robot 1 as a static computation node |

| Task Plan | Failure States; events | Repair Actions; back-up plans |
|---|---|---|
| | Robot 1 Communication Failure | Move Robot 2 to replace Robot 1 |
| | Robot 1 Battery Low/Failure | Use alternate low power communication to offload data/computation<br>Move Robot 2 to replace Robot 1 |
| | Robot 1 Communication Link Failure | Move Robot 1 closer to offload location<br>Try other communication ports<br>Offload data to nearest Robot for relay |
| | Offloaded Robot 2 Compute Failure/ exceeding limits | Re-Run the computation in alternate computation node Relax time completion limits for the task |

These failure cases may be incorporated within the task execution to create robot offloading scenarios.

Figure 5:
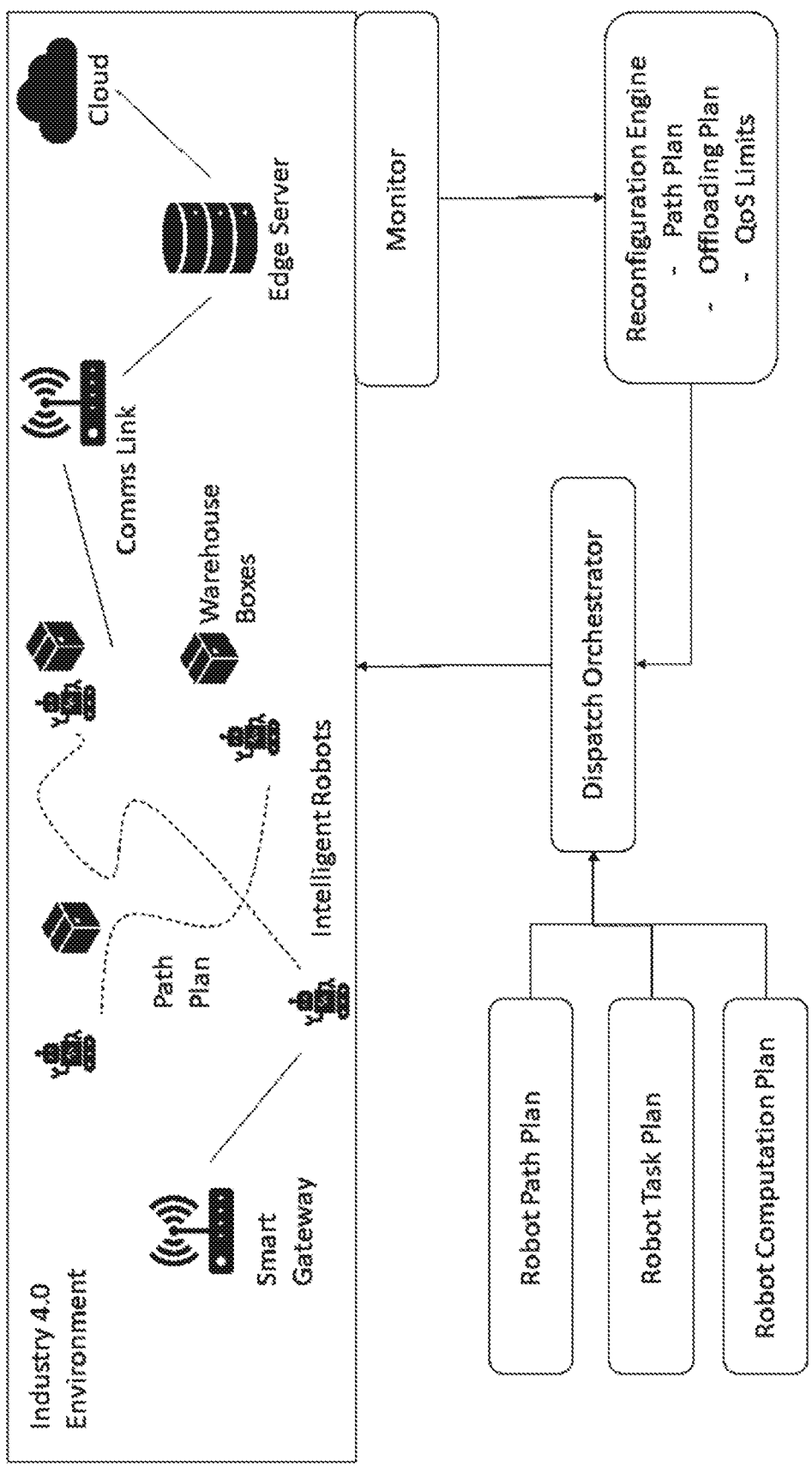
FIG. 5 shows a schematic deployment of multiple robots in an Industry 4.0 factory.

FIG. 5 shows an exemplary deployment of multiple robots in an Industry 4.0 factory. Based on the domain specification and the high-level goal, robotic task/path/computation plans are created. These can exploit smart gateways and other robotic entities for computation/communication. The path taken can be sub-optimal in one domain (time/battery usage) in order to increase reliability in other domains (communication link, computational devices). The monitor may reconfigure the plans in case of deviation in QoS limits or failure to reach goals with current plans.

Figure 6:
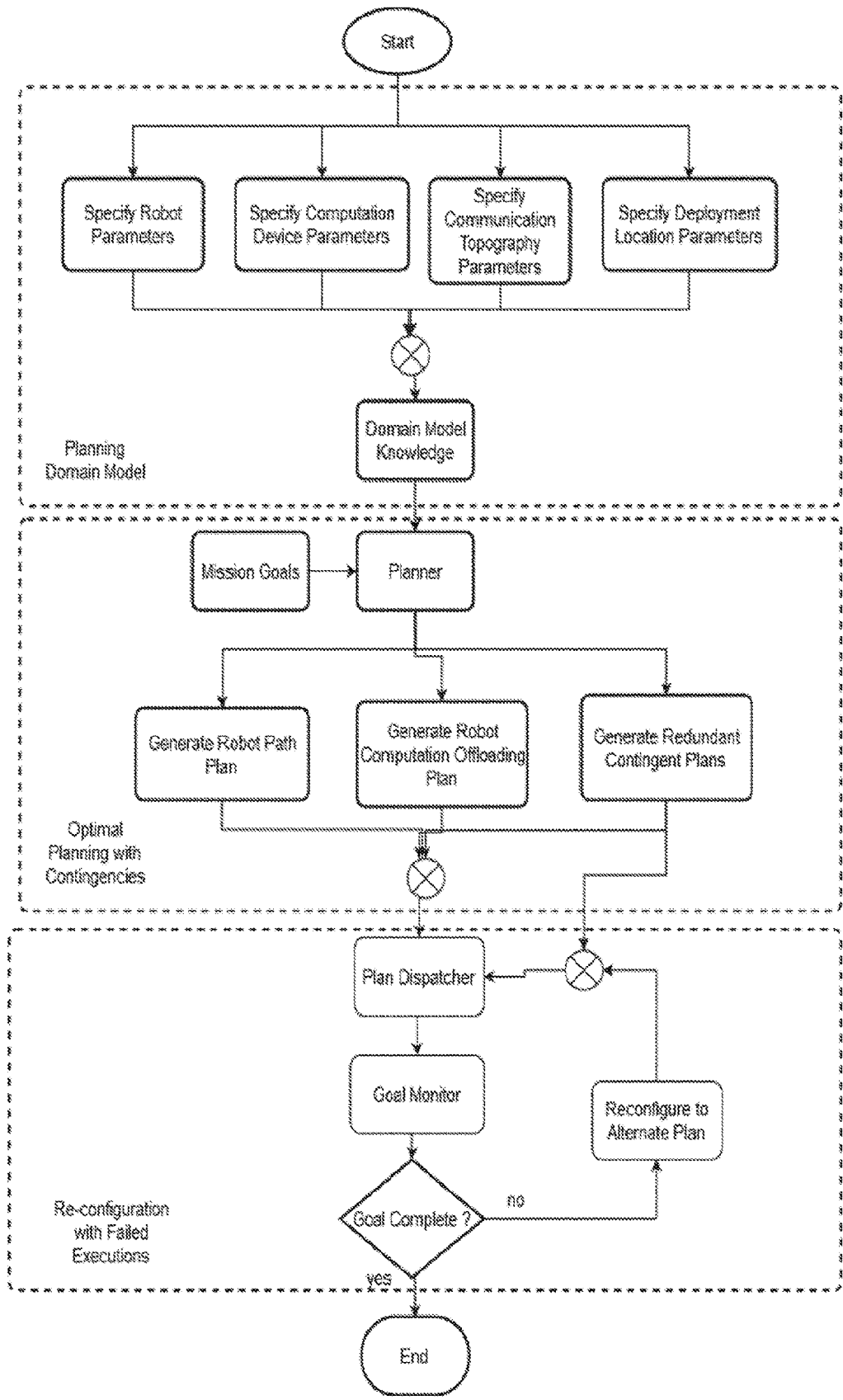
FIG. 6 shows a schematic overview depicting modules according to embodiments herein.

Embodiments herein may be illustrated in modules and FIG. 6 represents the interconnection between major modules. It is herein briefly described with more details presented in the detailed description section:

Domain Models—The initial knowledge specification flow integrates robot specification, computation devices, communication topology and location specific parameters, i.e. the initial parameters.

Optimal Planning and Scheduling—The domain models are incorporated with the mission goals (problem file) to generate an optimal plan. This plan not only contains the path/mission plan but also the offloading plan that can coordinate other robots.

Contingent Planning—Incorporated within this plan are also contingencies such as robot failure, communication loss and battery degradation. The advantage of pre-computing back-up plans in these scenarios is quick resolution and matching to failure resolution templates.

Reconfiguration with Execution Failures—The computed multi-robot plans are then dispatched and executed. A monitor confirms that plan milestones are achieved. In case of failures in execution, re-planning or back-up plan templates may be invoked.

Figure 7A:
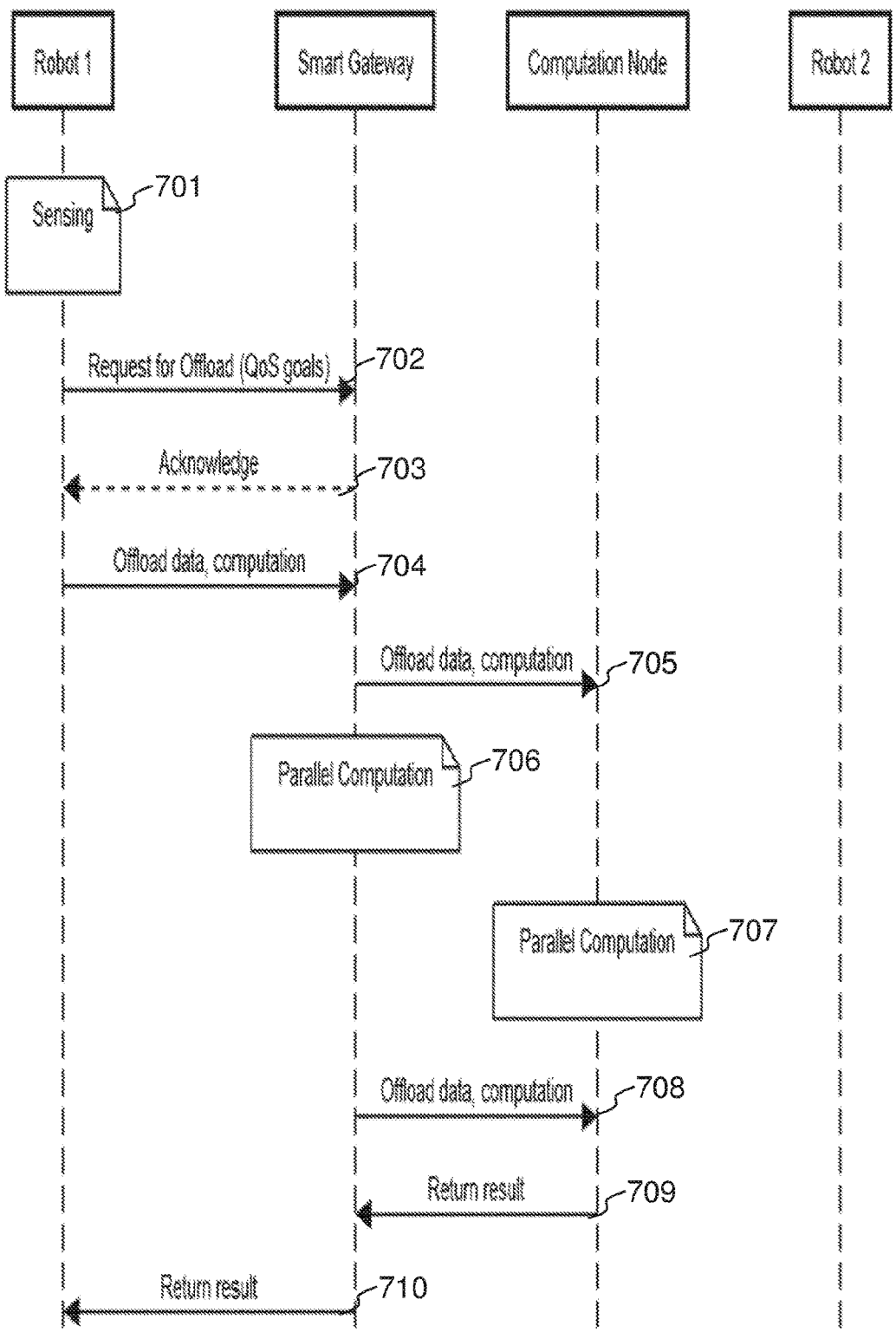
FIGS. 7A-7B show a flowchart depicting a deployment of embodiments herein.
Figure 7B:
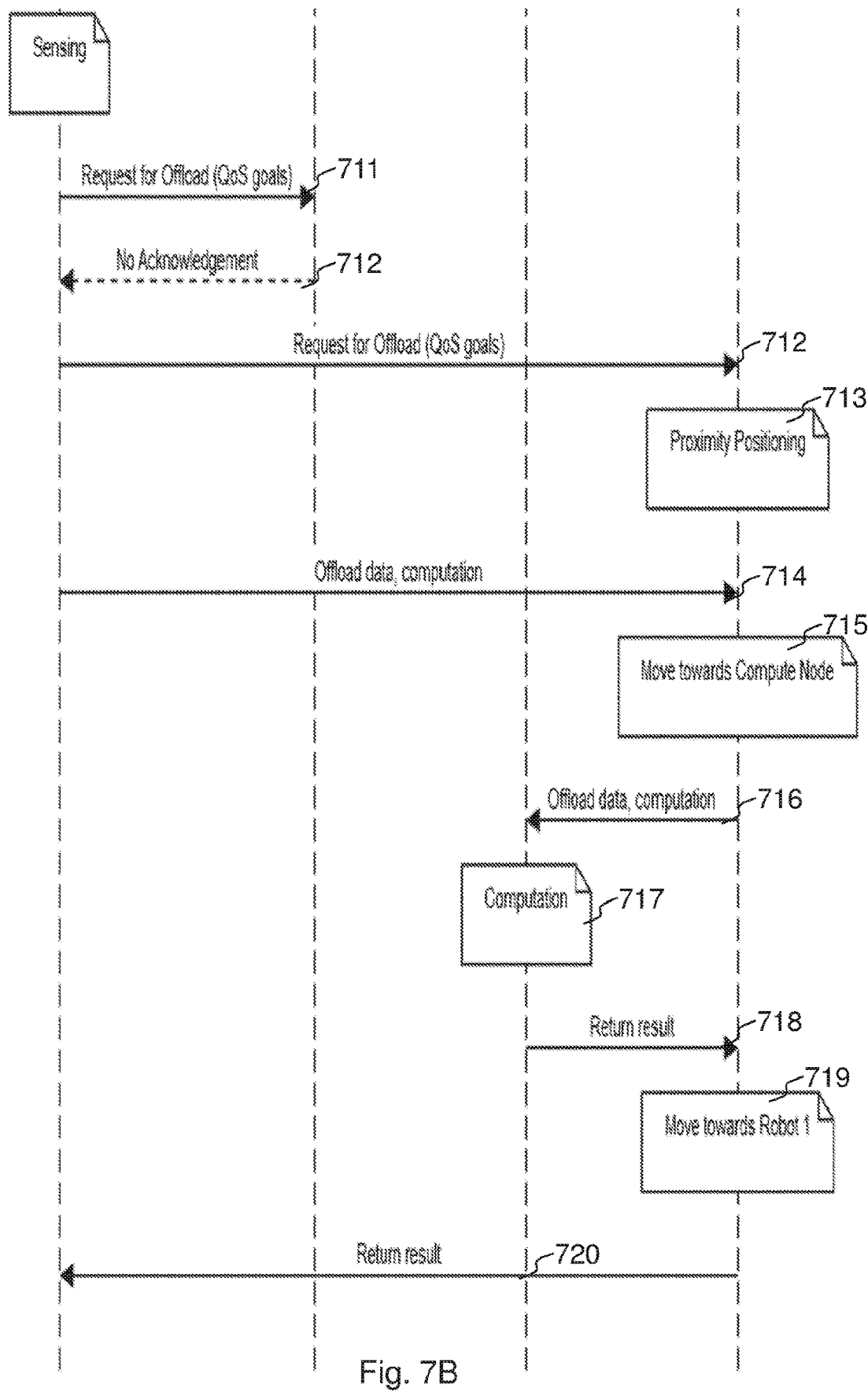

To further explain embodiments herein, a sequence diagram is provided in FIGS. 7A-7B, that links to the multi-robot task offloading example between a first robot Robot 1 and a second robot Robot 2. Robot 1 senses, action 701, and intends to offload data for computation. For example, the robot 1 sends, action 702, a request for offload (QoS goals), and receives, action 703, an acknowledgement from the smart gateway. The offload computation is sent, action 704, to the smart gateway. These requirements are provided to the smart gateway node that parallelizes some of the computation, action 705. E.g. some of the computation occurs on the smart gateway, action 706, while the rest is offloaded, action 707, 708, to a more powerful computation node. The results are returned within the constraints (time, accuracy, energy use) to Robot 1, actions 709-710.

The next sensing episode, however, deals with some failures according to embodiments herein. Robot 1 is unable to receive an acknowledgement for offloading from the smart gateway node, actions 711 and 712. Instead, Robot 2 is informed of the failure and then positioned in a desirable location to receive offloaded data according to a back-up plan, action 713. Robot 2 then moves in proximity to the computation node to offload the data/computation, actions 714-717. On completion, Robot 2 delivers the result of the computation to the original Robot 1, actions 718-720. This shows a coordinated task plan involving multi-robot coordination, time-dependent offloading and synchronization.

It must be noted that these are not hard-coded optimization steps. Rather, due to the use of automated planning techniques, state changes are recognized to trigger alternative actions.

Embodiments herein may be implemented along the lines of any one of the models described in e.g. Hu et al., Cloud Robotics: Architecture, Challenges and Applications, IEEE Network, 2012; accessible at https://ieeexplore.ieee.org/document/6201212, viz, peer-based, proxy-based or clone-based, depending on the specific implementation needs of the developer.

Peer-Based Model: each computing device e.g. robot or virtual machine (VM) in an ubiquitous cloud is considered as a computing unit. These e.g. robots and VMs form a fully distributed computing mesh. A task can be divided into smaller modules for execution over a subset of the computing devices in the computing mesh.

Proxy-Based Model: in the group of networked computing devices, one computing device may function as a group leader, communicating with a proxy VM in the cloud infrastructure, to bridge the interaction between the robotic network and the cloud. The set of computing devices are organized into a two-tier hierarchy.

Clone-Based Model: each computing device has a corresponding system level clone in the cloud. A task can be executed in the computing device or in its clone. The set of robotic clones also form a peer-to-peer network with better connectivity than the physical network. Moreover, this model allows for sporadic outage in the physical network.

Note that newer technologies such as containers with libraries of functions and computation data may also be used in this model.

To perform the method actions mentioned above for handling one or more operations in the communications network comprising the plurality of computing devices performing one or more tasks, the network node 15 may comprise an arrangement depicted in two embodiments in FIG. 8.

The network node 15 may comprise a communication interface 800 depicted in FIG. 8, configured to communicate e.g. with the communications network 100 also referred to as a cloud network. The communication interface 800 may comprise a wireless receiver (not shown) and a wireless transmitter (not shown) and e.g. one or more antennas. The embodiments herein may be implemented through a processing circuitry 801 configured to perform the methods herein. The processing circuitry may comprise one or more processors. Thus, it is herein provided a network node comprising processing circuitry and memory, said memory comprising instructions executable by said processing circuitry whereby said network node 15 is operative to perform the methods herein.

The network node 15 may comprise an obtaining unit 802, e.g. receiver, transceiver or retriever. The processing circuitry 801, the network node 15 and/or the obtaining unit 802 is configured to obtain initial parameters relating to the plurality of computing devices, environment and the communications network. The initial parameters comprise a device specific parameter, a communication topology, map information of the environment and/or a location specific parameter. The device specific parameter may comprise one or more of the following: computational capability, memory capability, and/or battery capability of the computing devices. The initial parameters may be recorded by one or more computing devices or network node or be pre-configured.

The network node 15 may comprise a generating unit 803, e.g. calculator, or computer. The network node 15, the processing circuitry 801, and/or the generating unit 803 is configured to generate the plan by taking one or more operation goals involving the plurality of computing devices into account as well as the obtained initial parameters, wherein the generated plan relates to operation of the plurality of computing devices. The network node 15, the processing circuitry 801, and/or the generating unit 803 is configured to compute the number of back-up plans, wherein the number of back-up plans are taking one or more events into account wherein the one or more events relate to operation of the plurality of computing devices. The generated plan and/or the computed back-up plan may comprise communication paths, movement paths, operation goals, computational offloading, and/or task offloading between the plurality of computing devices. The number of back-up plans may be computed using changed initial parameters. The one or more operation goals may comprise at least a goal relating to time, battery usage, computational capacity, and/or communication performance. The plan and/or the number of back-up plans may be generated or computed using a machine learning model, such as a neural network or a decision tree.

The network node 15 may comprise an executing unit 804, e.g. transmitter, receiver or similar. The network node 15, the processing circuitry 801, and/or the executing unit 804 is configured to execute the one or more operations using the generated plan, and in case the one or more events occur executing the one or more operations, using the computed back-up plan related to the occurred one or more events. The one or more events relate to changing environment, performance of the computing devices, and/or the communications network. The one or more events may comprise a computing device failure, a communication loss, alteration in environment, and/or a battery degradation. The one or more events may e.g. comprise a deviation in QoS limits or a failure to reach a goal with a current plan.

The network node 15 may further comprise a memory 870 comprising one or more memory units to store data on. The memory comprises instructions executable by the processor. The memory 870 is arranged to be used to store e.g. measurements, plans, back-up plans, goals, initial parameters, sensing data, events, occurrences, configurations and applications to perform the methods herein when being executed in the network node 15.

Those skilled in the art will also appreciate that the units in the network node 15 mentioned above may refer to a combination of analogue and digital circuits, and/or one or more processors configured with software and/or firmware, e.g. stored in the network node 15, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 890 comprises instructions, which when executed by the respective at least one processor, cause the at least one processor of the network node 15 to perform the actions above.

In some embodiments, a carrier 880 comprises the computer program 890, wherein the carrier 880 is one of an electronic signal, an optical signal, an electromagnetic signal, a magnetic signal, an electric signal, a radio signal, a microwave signal, or a computer-readable storage medium.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first network node for handling one or more operations in a communications network comprising a plurality of computing devices performing one or more tasks, the method comprising:

obtaining initial parameters relating to the plurality of computing devices, an environment, and the communications network;

generating a plan based on one or more operation goals involving the plurality of computing devices and the obtained initial parameters, wherein the generated plan relates to one or more operations of the plurality of computing devices;

determining a number of one or more back-up plans, wherein the number of back-up plans are determined based on one or more events, and further wherein the one or more events relate to the one or more operations of the plurality of computing devices; and executing the one or more operations using the generated plan, and in case the one or more events occur while executing said one or more operations, using the generated one or more back-up plans related to the occurred one or more events, wherein the plurality of computing devices includes a first computing device and a second computing device, the generated plan comprises triggering offloading of one or more tasks of the first computing device to a computation node via a second network node, the generated one or more back-up plans comprise triggering the offloading of said one or more tasks of the first computing device to the computation node via the second computing device, the triggering of the offloading via the second network node comprises transmitting, to the second network node, a request for offloading said one or more tasks of the first computing device, the one or more events which occurred while executing the one or more operations comprise failing to receive, from the second network node, a response message responding to the request for offloading, the triggering of the offloading via the second computing device comprises transmitting, to the second computing device, a request for offloading said one or more tasks of the first computing device, and the second computing device is configured to move closer to the second network node based at least on receiving the request for offloading.

2. The method according to claim 1, wherein the generated plan comprises communication paths, movement paths, the one or more operation goals, computational offloading, and/or task offloading between the plurality of computing devices.

3. The method according to claim 1, wherein the one or more events relate to changing environment, performance of the computing devices, and/or the communications network.

4. The method according to claim 1, wherein
the initial parameters comprise a device specific parameter, a communication topology, map information of the environment and/or a location specific parameter, and
the device specific parameter comprises one or more of: computational capability, memory capability, and/or battery capability of the computing devices.

5. The method according to claim 1, wherein the initial parameters are recorded by the plurality of computing devices or the first network node or pre-configured.

6. The method according to claim 1, wherein the one or more operation goals comprise at least a goal relating to time, battery usage, computational capacity, and/or communication performance.

7. The method according to claim 1, wherein the one or more events comprise a computing device failure, a communication loss, alteration in environment, a battery degradation, a deviation in quality of service, QoS, limits and/or a failure to reach a goal with a current plan.

8. The method according to claim 1, wherein the plan and/or the number of back-up plans are generated or computed using a machine learning model.

9. A first network node for handling one or more operations in a communications network comprising a plurality of computing devices performing one or more tasks, the first network node comprising:

a communication interface configured to communicate via the communications network; and processing circuitry, wherein the first network node is configured to:

obtain initial parameters relating to the plurality of computing devices, an environment, and the communications network;

generate a plan based on one or more operation goals involving the plurality of computing devices and the obtained initial parameters, wherein the generated plan relates to one or more operations of the plurality of computing devices;

determine a number of one or more back-up plans, wherein the number of back-up plans are determined based on one or more events, and further wherein the one or more events relate to the one or more operations of the plurality of computing devices; and execute the one or more operations using the generated plan, and in case the one or more events occur while executing said one or more operations, using the generated one or more back-up plans related to the occurred one or more events, wherein the plurality of computing devices includes a first computing device and a second computing device, the generated plan comprises triggering offloading of one or more tasks of the first computing device to a computation node via a second network node, the generated one or more back-up plans comprise triggering the offloading of said one or more tasks of the first computing device to the computation node via the second computing device, the triggering of the offloading via the second network node comprises transmitting, to the second network node, a request for offloading said one or more tasks of the first computing device, the one or more events which occurred while executing the one or more operations comprise failing to receive, from the second network node, a response message responding to the request for offloading, the triggering of the offloading via the second computing device comprises transmitting, to the second computing device, a request for offloading said one or more tasks of the first computing device, and the second computing device is configured to move closer to the second network node based at least on receiving the request for offloading.

10. The first network node according to claim 9, wherein the generated plan comprises communication paths, movement paths, the one or more operation goals, computational offloading, and/or task offloading between the plurality of computing devices.

11. The first network node according to claim 9, wherein the one or more events relate to changing environment, performance of the computing devices, and/or the communications network.

12. The first network node according to claim 9, wherein
the initial parameters comprise a device specific parameter, a communication topology, map information of the environment and/or a location specific parameter, and
the device specific parameter comprises one or more of the following: computational capability, memory capability, and/or battery capability of the computing devices.

13. The first network node according to claim 9, wherein the number of back-up plans is computed using changed initial parameters.

14. The first network node according to claim 9, wherein the one or more operation goals comprise at least a goal relating to time, battery usage, computational capacity, and/or communication performance; and wherein the one or more events comprise a computing device failure, a communication loss, alteration in environment, and/or a battery degradation.

15. The first network node according to claim 9, wherein the one or more events comprise a deviation in quality of service, QoS, limits or a failure to reach a goal with a current plan.

16. The first network node according to claim 9, wherein the plan and/or the number of back-up plans are generated or computed using a machine learning model.

* * * * *